Sept. 4, 1923.
C. E. BARR ET AL
1,466,656
ELECTRIC TOASTER
Filed April 17, 1922
2 Sheets-Sheet 1
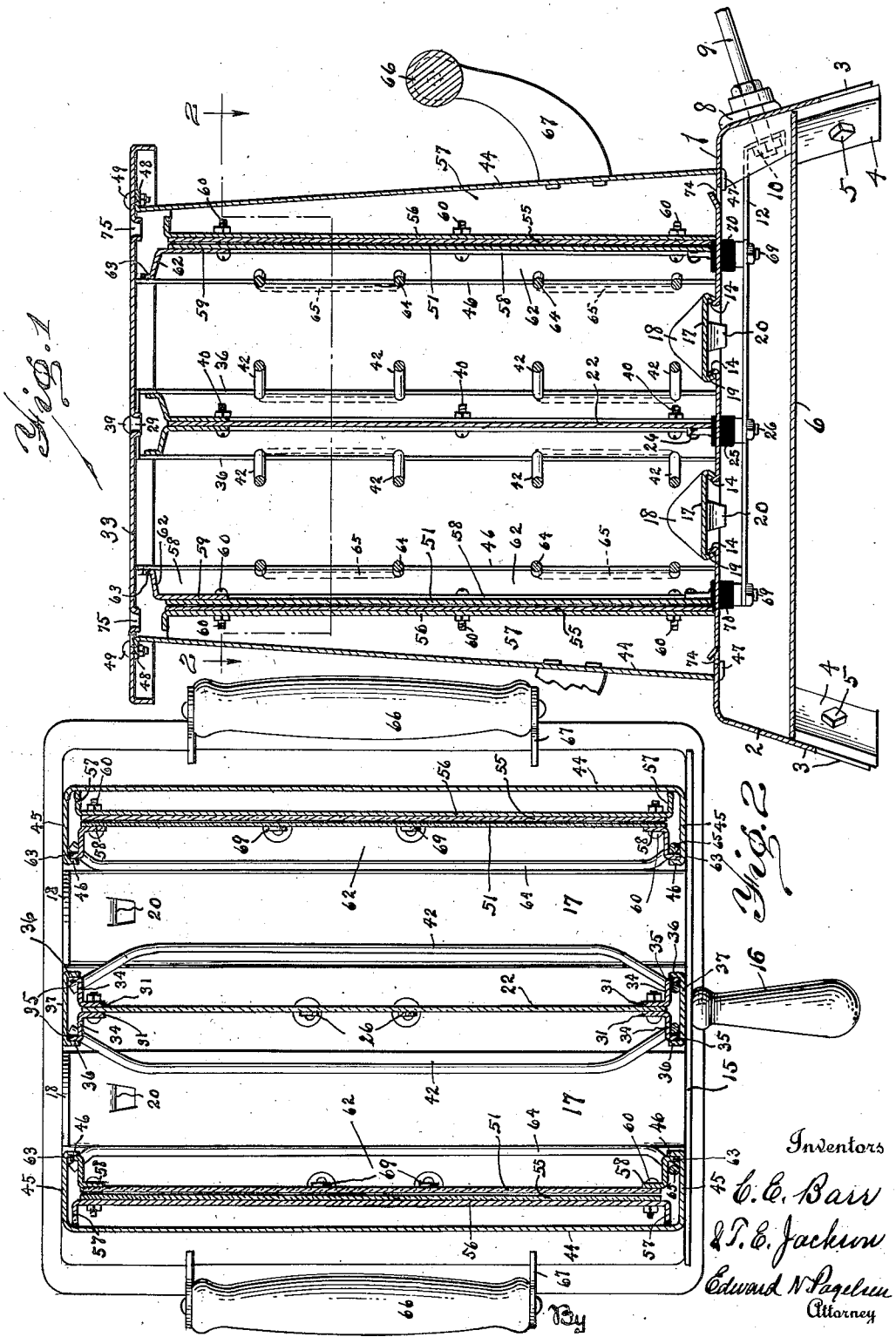
Inventors
C. E. Barr
& T. E. Jackson
Edward N Pagelsen
Attorney Sept. 4, 1923.   C. E. BARR ET AL   1,466,656
ELECTRIC TOASTER
Filed April 17, 1922   2 Sheets-Sheet 2
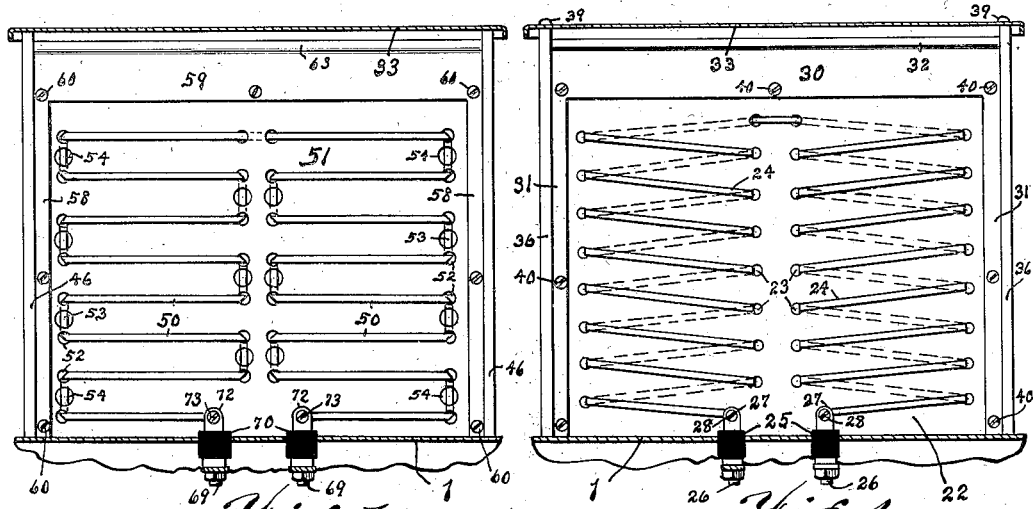
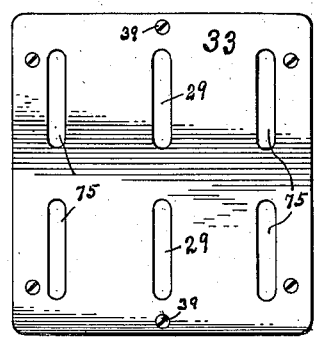
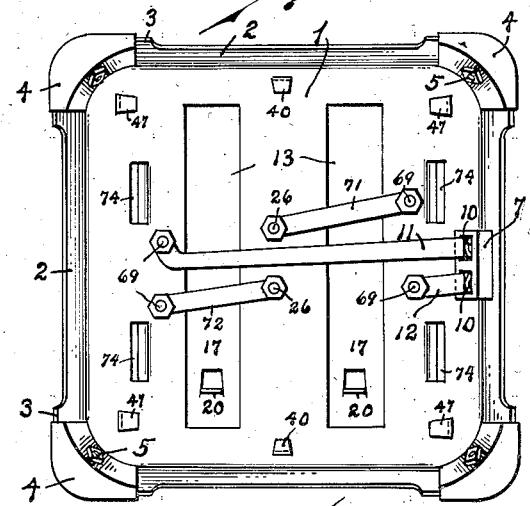
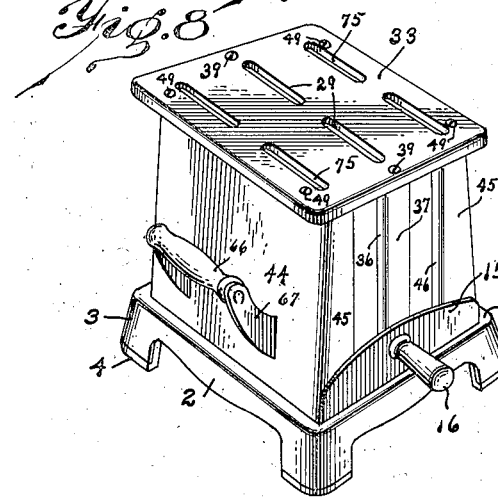
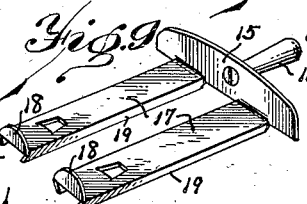

Patented Sept. 4, 1923.

1,466,656

UNITED STATES PATENT OFFICE.

CLARENCE E. BARR AND THOMAS E. JACKSON, OF DETROIT, MICHIGAN, ASSIGNORS OF ONE-FOURTH TO FLORENCE KING ALLEN AND ONE-FOURTH TO WILLIAM M. MERVIN, BOTH OF DETROIT, MICHIGAN.

ELECTRIC TOASTER.

Application filed April 17, 1922. Serial No. 554,066.

*To all whom it may concern:*

Be it known that we, CLARENCE E. BARR and THOMAS E. JACKSON, citizens of the United States and of Canada, respectively, and residents of Detroit, Wayne County, Michigan, have invented a new and Improved Electric Toaster, of which the following is a specification.

This invention relates to means adapted to toast both sides of a plurality of slices of bread simultaneously and at the same time heat articles placed on the top plate of the toaster, and its object is to provide a device of this character which shall have a maximum toasting effect, which can be cheaply constructed and which will not readily get out of order.

In the accompanying drawings, Fig. 1 is a central transverse section of this improved toaster. Fig. 2 is a section on the line 2—2 of Fig. 1. Fig. 3 is an inside elevation of one of the outer heating elements. Fig. 4 is a similar elevation of the inner heating element. Fig. 5 is a bottom plan of the base. Fig. 6 is a plan of the top plate. Fig. 7 is a section showing the manner of attaching the supports for the inside heating element to the top plate. Fig. 8 is a perspective view of this improved toaster. Fig. 9 is a perspective of the toast carrier.

Similar reference characters refer to like parts throughout the several views.

This toaster is formed of a base and the parts connected thereto, an inner and two outer heating elements and the supports therefor, a toast carrier slidable on the base between the heating elements and a top plate which is preferably flat and formed with slots through which hot air may rise to heat utensils placed thereon. The base is formed with an upper plate 1 and a circumferential flange 2 which is extended downward at the corners 3. These corners are rounded and in them are secured the legs 4 by means of the bolts 5, and on the tops of these legs we preferably place a sheet 6 of insulating material, such as indurated fibre, to prevent ready access to the electric conductors secured to the bottom of the plate 1. Attached to the inside and outside of the flange 2 at the middle of one of its sides are well known blocks 7 and 8 of insulation which carry the connecting pins 9 having nuts 10 on their inner ends to which the connector bars 11 and 12 are attached. These bars will be discussed later on.

The plate 1 is formed with two slots 13 and the metal at the edges of these slots is turned up into guides 14, as shown in Fig. 1. The toast carrier is formed of a cross bar 15 to which a handle 16 and two longitudinal plates 17 are attached. The free ends of these plates 17 are bent up to constitute flanges 18 which prevent the slices of bread from sliding off the plate 17 when the carrier is pulled out. The edges 19 of these plates 17 are bent down and in as shown in Figs. 1 and 9 and they fit around the flanges 14 on the base 1 and these flanges 14 and 19 support and guide the toast carrier. The small tongues 20 may be cut from these plates 17 and bent down as shown in the drawings in order to prevent the toast carrier from being removed from the toaster after it has once been positioned.

The middle or inner heating element consists of a sheet of mica 22 formed with parallel rows of holes 23 in which a tape 24 of heat resisting metal, such as nicrome metal, is laced back and forth as shown in Fig. 4. Mounted in the plate 1 and insulated therefrom by means of washers 25 of non-conducting material, are the bolts 26 having eyes 27 at their upper ends to which this tape 24 may be attached by means of screws 28.

This sheet of mica is held between two supporting frames consisting of the top bars 30 and the side bars 31, these top bars having flanges 32 which are spaced a short distance from the top plate 33 of the toaster and permit air to pass between them and this top plate, which air escapes through the slots 29. The side bars 31 are also formed with flanges 34 as shown in Fig. 2 and their outer edges 35 fit between the flanges 36 of the upright channels 37. The upper ends of these channels 37 are bent inward to constitute the flanges 38, as shown in Fig. 7, and these flanges are secured to the top plate 33 by means of bolts 39.

Bolts 40ª extend through the top bar 30 and side bars 31 and through the sheet 22 of mica and thus constitute a rigid structure, which, after it is positioned between the channels 37, is very rigid. The channels 37 are formed with tongues 40 at their lower ends which extend through slots in the plate 1 of the base and are then bent down to lock these channels and inside heating element rigidly to the bottom.

In order to prevent the toast from touching the mica and the heating tape 24, we provide wire spacers 42 which are connected intermediate their ends in pairs and each pair is mounted in one of the side bars 31 and extend horizontally across the face of the inside heating member and have their ends extending through holes in the opposite side bars, as shown in Figs. 1 and 2. These spacers are positioned before the supporting devices are attached to the mica sheet.

The outer heating elements are supported in upright casings, each of which comprises a back 44 which leans inwardly, sides 45 and inturned flanges 46. At the bottom of the back are tongues 47 which extend through small slots in the plate 1 and thus secure these casings to the base. The top edges of the backs 44 are turned outward to form the flanges 48 which are secured to the top plate 33 by means of bolts 49.

The heating tape 50 is wound on a sheet 51 of mica provided with holes 52 through which the tape is woven. In Fig. 4 the sheet 22 is shown with the tape 24 passing back and forth through the holes 23 so as to have a substantially equal amount of tape on each side of the mica. In Fig. 3, however, the tape 50 is shown to be principally on the inner side of the mica and the short parts 53 of the tape are exposed by means of the holes 54 which are cut through the mica in order that the heat from these connecting portions 53 may be radiated inwardly toward the toast.

In order to prevent as much as possible a loss of heat from this tape 50 outward, an additional sheet 55 of mica is placed on the outer side of the sheet 51. This outer sheet of mica is backed by a plate 56 of metal whose vertical edges are bent outward to constitute the flanges 57 which engage the back 44 of the end casings. On the inner side of the sheet 51 is a frame consisting of the side bars 58 and top bar 59 which are secured to the back plate 56 by means of the bolts 60 which pass through the two sheets of mica through the frame and through the back plate 56. The side and top edges of this frame are bent inward and then upward to constitute the flanges 62 and 63, the flanges 63 of the side bars of the frame being in engagement with the inturned flanges 46 of the outer casings whereby the whole structure is securely positioned.

Spacers 64 are also provided with connecting portions 65, which connect them in pairs, are mounted in the flanges of these side bars 58, as described in connection with the guide bars 42, but the shape of these spacers 64 differs slightly from the spacers 42.

If desired, handles 66 may be mounted in the bracket 67 which may be attached to the inclined back portions 44 of the outer casings.

As shown in Fig. 3, the screws 69 extend up through washers 70 of insulating material mounted in the plate 1 and the tape 50 is attached to the eyes 72 on the upper end of these bolts by means of screws 73.

Referring now to Fig. 5, it will be noticed that the conductor 12 extends from one of the contact pins 9 to one of the screws 69. The other screw 69 of this same heating element is connected to a screw 26 of the inner heating element by means of a conductor bar 71. The other screw 26 of the inner heating element is connected to a screw 69 of the second outer heating element by means of a conductor bar 72 while the conductor bar 11 connects the second screw 69 of the second outer heating element to the other contact pin 9. The current therefore passes in series through all three of the heating tapes 24 and 50. It is obvious that any electrician can connect any one or more of these heating elements in parallel if desired.

Slots 74 may be formed in the base plate 1 to admit air which rises between the backs 44 of the end casings and the backing plates 56 and escapes through the slots 75 in the top 33. This air becomes quite hot and is available for heating the plates on which the toast is to be served and for heating other containers.

The details of construction and the proportions of the parts may all be changed by those skilled in the art without departing from the spirit of our invention as set forth in the following claims.

We claim:—

1. A toaster comprising a base, a top, a series of parallel heating elements extending substantially the length of the toaster, between the base and the top, and casings for the outer heating elements.

2. A toaster comprising a base, a top, and a series of heating elements extending between the base and the top, one of said elements consisting of a sheet of mica having a series of holes, a tape of resistance metal laced through said holes so that there is substantially the same amount of tape on each side of the mica, and means connecting to the sheet of mica and to the base and top.

3. A toaster comprising a base, a top, a series of heating elements extending between the base and the top, one of said elements consisting of a sheet of mica having a series of holes, a tape of resistance metal laced through said holes so that there is substantially the same amount of tape on each side of the mica, a frame extending along the side edges and top of each side of the mica sheet, and means to connect the frames to the base and top.

4. A toaster comprising a base, a top, a series of heating elements extending between the base and the top, one of said elements consisting of a sheet of mica having a series of holes, a tape of resistance metal laced through said holes so that there is substantially the same amount of tape on each side of the mica, a frame extending along the side edges and top of each side of the mica sheet, and channel bars extending along the side edges of said frames and connecting to the base and top.

5. A toaster comprising a base, a top, a series of heating elements extending substantially the length of the toaster between the base and the top, casings for the outer heating elements, and a toast carrier embodying plates slidable longitudinally of the toaster between said heating elements and means connecting the plates.

6. A toaster comprising a base, a top, a series of heating elements extending substantially the full length of the toaster between the base and the top, casings for the outer heating elements, means to support the inner heating element, and guard wires extending longitudinally of the toaster across said heating elements.

7. A toaster comprising a base, a top and a pair of heating elements extending between the base and top, each consisting of a sheet of non-conducting heat resisting material having a series of holes in pairs, a tape of resistant metal laced through said holes so that a major portion is on the inner side of the sheet and a minor portion on the outside of the sheet, a second sheet of such material outside each of the perforated sheets, and means connected to the base and top to secure the heating elements in position.

8. A toaster comprising a base, a top and a pair of heating elements extending between the base and top, each consisting of a sheet of non-conducting heat resisting material having a series of holes in pairs, a tape of resistant metal laced through said holes so that a major portion is on the inner side of the sheet and a minor portion on the outside of the sheet, a second sheet of such material outside each of the perforated sheets, a frame consisting of side and top bars attached to the side and top edges of the two sheets of each heating element, and supporting means for the frames attached to said base and top.

9. A toaster comprising a base, a top and a pair of heating elements extending between the base and top, each consisting of a sheet of non-conducting heat resisting material having a series of holes in pairs, a tape of resistance metal laced through said holes so that a major portion is on the inner side of the sheet and a minor portion on the outside of the sheet, a second sheet of such material outside each of the perforated sheets, a frame consisting of side and top bars attached to the inner side of each perforated sheet and having inwardly extending flanges along its side edges, a plate lying against each outer sheet and having outwardly extending flanges along its side edges, bolts to unite the sheets, frame and plates of each heating element, and a casing for each heating element comprising a side and end flanges extending around the flanges of said frame and plate, said casing being connected to said base and top.

10. A toaster comprising a base, a top and a pair of heating elements extending between the base and top, each consisting of a sheet of non-conducting heat resisting material having a series of holes in pairs, a tape of resistant metal laced through said holes so that a major portion is on the inner side of the sheet and a minor portion on the outside of the sheet, a second sheet of such material outside each of the perforated sheets, and means connected to the base and top to secure the heating elements in position, said perforated sheets being formed with larger holes between said pairs of holes to permit the heat of the tape on the outer side of the sheet to pass inward.

11. A toaster comprising a base, a top, a series of heating elements extending between the base and the top, and casings for the outer heating elements, said base and top being perforated to permit upward flow of heated air.

CLARENCE E. BARR.
THOMAS E. JACKSON.

DISCLAIMER 1,466,656.—*Clarence E. Barr* and *Thomas E. Jackson*, Detroit, Mich. ELECTRIC TOASTER. Patent dated September 4, 1923. Disclaimer filed May 11, 1931, by the assignee, *Harry C. Le Vine*.

Hereby enters this disclaimer to that part of the claims in said specification which are in the following words, to wit:

"1. A toaster comprising a base, a top, a series of parallel heating elements extending substantially the length of the toaster, between the base and the top, and casings for the outer heating elements."

"6. A toaster comprising a base, a top, a series of heating elements extending substantially the full length of the toaster between the base and the top, casings for the outer heating elements, means to support the inner heating element, and guard wires extending longitudinally of the toaster across said heating elements."

[*Official Gazette May 26, 1931.*]